United States Patent
Pfund et al.

(10) Patent No.: US 7,486,490 B2
(45) Date of Patent: Feb. 3, 2009

(54) ACTUATOR FOR THE ACTUATION OF A CLUTCH AND/OR A GEAR MECHANISM

(75) Inventors: Thomas Pfund, Leiberstung (DE);
Wai-Wal Buchet, Strassburg (FR);
Sven-Jostein Kro, Ottersweler (DE);
Martin Zimmermann, Sasbach (DE);
Juergen Gerhart, Appenweier (DE);
Martin Fuss, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 238 days.

(21) Appl. No.: 11/637,974

(22) Filed: Dec. 13, 2006

(65) Prior Publication Data
US 2007/0139834 A1    Jun. 21, 2007

(30) Foreign Application Priority Data
Dec. 17, 2005  (DE) .................. 10 2005 060 599

(51) Int. Cl.
*H02H 5/04*    (2006.01)
(52) U.S. Cl. .............. 361/25; 361/1; 361/23; 361/24; 361/27; 318/434; 318/432; 192/3.56; 192/3.58
(58) Field of Classification Search ........... 361/25, 361/23, 24, 1, 27; 318/434, 432, 471; 192/3.56, 192/3.58
See application file for complete search history.

(56) References Cited

U.S. PATENT DOCUMENTS

| | | | | |
|---|---|---|---|---|
| 4,944,200 A | * | 7/1990 | Benford et al. | 477/155 |
| 5,211,080 A | * | 5/1993 | Leising et al. | 475/123 |
| 6,151,544 A | * | 11/2000 | Amisano et al. | 701/67 |
| 6,882,124 B2 | * | 4/2005 | Waite | 318/551 |
| 7,209,862 B2 | * | 4/2007 | Taniguchi et al. | 702/183 |
| 2006/0125439 A1 | * | 6/2006 | Ajima et al. | 318/716 |

FOREIGN PATENT DOCUMENTS

| | | |
|---|---|---|
| DE | 198 23 772 | 12/1998 |
| DE | 103 16 436 | 12/2003 |
| GB | 2 375 155 | 12/2002 |

\* cited by examiner

*Primary Examiner*—Rita Leykin
(74) *Attorney, Agent, or Firm*—Simpson & Simpson, PLLC (57) ABSTRACT

An actuator for a clutch or gear mechanism in a motor vehicle comprises an electric motor and an incremental encoder. The encoder comprises a position measurement signal output at which a position measurement signal can be output which has a number of different signal states, each of which is assigned to a relative position between a primary part and a secondary part of the electric motor. For the commutation of the electric motor, the position measurement signal output is connected to a position measurement signal input of a control device for a motor winding of the electric motor. The control device comprises a device for checking the plausibility of the position measurement signal and is designed in such a manner that on the occurrence of an implausible signal state the power supply to the electric motor is disconnected and/or the power of the electric motor is limited.

9 Claims, 4 Drawing Sheets

ACTUATOR FOR THE ACTUATION OF A CLUTCH AND/OR A GEAR MECHANISM

CROSS REFERENCE TO RELATED APPLICATIONS

This patent application claims priority of German Patent Application No. 10 2005 060 599.0, filed Dec. 17, 2005, which application is incorporated herein by reference.

FIELD OF THE INVENTION

The invention relates to an actuator for actuation of a clutch and/or a gear mechanism in a motor vehicle, comprising an electric motor and an incremental encoder therefor, where the incremental encoder comprises a position measurement signal output at which it is possible to output a position measurement signal having a number of different signal states, each of which is assigned to a relative position between a primary part and a secondary part of the electric motor, where, for the commutation of the electric motor, the position measurement signal output is connected to a position measurement signal input of a control device for a motor winding of the electric motor, where the control device comprises a device for checking the plausibility of the position measurement signal and is designed in such a manner that on the occurrence of an implausible signal state the power supply to the electric motor is disconnected and/or the power of the electric motor is limited. Furthermore, the invention relates to an actuator serving for the actuation of a clutch and/or a gear mechanism in a motor vehicle and comprising an electric motor comprising a motor winding and an incremental encoder therefor, where the incremental encoder comprises a position measurement signal output which, for the commutation of the electric motor, is connected to a position measurement signal input of a control device for the electric motor, where the control device comprises a power supply device for the incremental encoder and is connected via an output stage to the motor winding. In addition, the invention relates to a process for the operation of an actuator in a motor vehicle and comprising an electric motor, where a position measurement signal for the electric motor is registered and the electric motor is commutated as a function of the position measurement signal, where the position measurement signal has a number of different signal states, each of which is assigned to a relative position between a primary part and a secondary part of the electric motor, where the plausibility of the position measurement signal is checked and on the occurrence of an implausible signal state the power supply to the electric motor is disconnected and/or the power of the electric motor is limited.

BACKGROUND OF THE INVENTION

An actuator of the type described above, which is intended for the actuation of a selector shaft of an automated transmission in a motor vehicle, is known from practice. It comprises as a drive an electric motor with a stator comprising a winding and a permanent-magnet rotor working together therewith. On the periphery of the rotor a row of permanent-magnet segments is disposed which extends in the peripheral direction and has alternating north and south poles. Disposed on the electric motor to register the relative position between the rotor and the stator is an incremental encoder which comprises, on the stator, several Hall sensors which are spaced from one another in the peripheral direction and which detect the magnetic field of the permanent-magnet segments passing by. The incremental encoder is connected to a control device which evaluates the measurement signals of the Hall sensors and commutates the winding as a function of the position of the rotor relative to the stator. The control device is disposed in a housing spatially separated from the incremental encoder and is connected via electrical cable to the incremental encoder. So that the selector shaft is not displaced in an uncontrolled manner when there is a failure or malfunction of the incremental encoder, the control device comprises a device for checking the plausibility of the position measurement signal. On the occurrence of an implausible signal state the power supply to the electric motor is disconnected with the aid of the control device. So that the electric motor can be produced economically and has low weight and compact dimensions, it is dimensioned so that it is indeed suitable for a short-time load but not for long-term operation. So that the electric motor nonetheless does not overheat in the operational states occurring in practice, the dimensioning is based on unfavorable conditions of operation, such as, for example, driving in mountainous terrain with a fully loaded motor vehicle and high ambient temperature. These conditions of operation occur only very rarely in the normal operation of the motor vehicle so that the electric motor is over-dimensioned for the loads customarily occurring during the operation of the motor vehicle.

SUMMARY OF THE INVENTION

In an advantageous form of embodiment of the invention the position measurement signal output comprises several output connections assigned to different positions or bits of the position measurement signal, where the incremental encoder is designed in such a manner that on the occurrence of an operating temperature lying outside of the range of theoretical values at least one output connection is set to a predefined, fixed electrical potential. The temperature limit of the electric motor can be realized still more economically thereby.

In a preferred development of the invention the incremental encoder comprises Hall sensors for the detection of a magnetic field dependent on the relative position between the primary part and the secondary part, where operating voltage connections of the Hall sensors are connected to the power supply device, and where the temperature-monitoring device is in controlling connection with the power supply device in such a manner that on the occurrence of an operating temperature lying outside of the range of theoretical values the electrical power supply voltage present at the operating voltage connection of at least one of the Hall sensors is reduced or switched off. The voltage at the output of the at least one Hall sensor is then reduced so much that the corresponding output signal of the control device is interpreted as "0". Also through this measure, a limit of the operating temperature of the electric motor is made possible with little complexity in the circuit technology.

It is advantageous if the temperature-monitoring device is in controlling connection with the power supply device in such a manner that on the occurrence of an operating temperature lying outside of the range of theoretical values the electrical power supply voltages present at the operating voltage connections of all of the Hall sensors is reduced or switched off. The temperature-limiting device for the electric motor can then be produced still more economically.

In an expedient development of the invention the incremental encoder is designed in such a manner that on the occurrence of an operating temperature lying outside of a first range of theoretical values an implausible first signal state, or a sequence of implausible first signal states, is/are applied at the position measurement signal input, and, on the occurrence of an operating temperature lying outside of a second range of theoretical values an implausible second signal state, or a sequence of implausible second signal states, is/are applied at the position measurement signal input, wherein the control device is designed in such a manner that on the occurrence of the first signal state, or the sequence of first signal states, the power of the electric motor is limited and on the occurrence of the second signal state, or the sequence of second signal states, the power supply to the electric motor is disconnected. A distinction is therefore made between a temperature warning and a temperature shutdown. On the occurrence of a temperature warning the electric motor can initially continue to be controlled via the control device, where, however, the control is accomplished in such a manner that positioning movements of the electric motor are limited to a necessary extent. This can, for example, be achieved by the fact that certain functions are temporarily disabled. Also, an overtemperature warning can be displayed to the driver. Should this measure not be sufficient to hold the operating temperature of the electric motor within the range of theoretical values, the electric motor is switched off to protect against thermal damage or destruction. Before switching off the electric motor, the motor vehicle can, if necessary, be brought into an uncritical operating state.

It is advantageous if the position measurement signal output comprises several output connections assigned to different positions or bits of the position measurement signal and if on the occurrence of the operating temperature lying outside of the first range of theoretical values a first output connection is set to a predefined, fixed electrical potential and on the occurrence of the operating temperature lying outside of the second range of theoretical values a second output connection is set to a predefined, fixed electrical potential.

Thereby, the temperature warning and switch-off function for the electric motor can be realized economically with very little complexity in circuit technology.

On overshoot of a predefined operating temperature of the electric motor a measurement error in the position measurement signal is simulated in order to achieve a switch-off and/or a limiting of power of the electric motor. The request for the switch-off and/or the power limit can thus be accomplished in a simple manner via the lines already present for the transmission of the position measurement signal.

The operating current of the actuator is therefore modulated as a function of the operating temperature measured in the incremental encoder and demodulated in the control device in order that the measured value for the operating temperature and/or the result of the comparison between the measured value and the predefined range of theoretical values is transmitted from the temperature-measuring device of the incremental encoder to the evaluation device. In an advantageous manner, the power supply lines already present between the control device and the incremental encoder are used for the transmission of information.

One object of the invention is to provide an actuator of the type stated in the introduction which can be produced economically and makes possible compact dimensions. Furthermore, there is the objective of specifying a process of the type stated in the introduction which can be carried out economically.

This object is realized with respect to the actuator by the fact that the incremental encoder comprises a temperature-monitoring device designed to register the operational temperature of the electric motor and that the incremental encoder is designed in such a manner that on the occurrence of an operating temperature lying outside of the range of theoretical values an implausible signal state is applied at the position measurement signal output.

Thereby, the lines provided for the transmission of the position measurement signal between the incremental encoder and the control device can also be used in an advantageous manner to disconnect and/or to limit the power supply of the electric motor if an operating state should ever occur in which the operating temperature of the electric motor exceeds a predefined limit value. In this way, an additional control line between the incremental encoder and the control device can be spared. The components present for a traditional actuator without a temperature-monitoring device, such as, for example, the control device, electrical connecting cables, or cable connector plugs, can be carried over without change to the actuator according to the invention. Since the operating temperature of the electric motor under unfavorable conditions of operation is limited, the electric motor can be dimensioned smaller than would be possible without such a limit. With this, one accepts in the bargain a limit of power and/or a switching off of the electric motor, and a reduction in convenience possibly associated therewith, under conditions of operation leading to a thermal peak load of the electric motor and occurring only very rarely in practice.

The object stated above is realized by the fact that the operating temperature of the electric motor is registered and compared to a predefined range of theoretical values and that on the occurrence of an operating temperature lying outside of the range of theoretical values an implausible signal state of the position measurement signal is produced.

The object stated above can also be realized by the fact that the incremental encoder comprises a temperature-measuring device for registering the operating temperature of the electric motor, that a comparison device for comparing the registered operating temperature to a predefined range of theoretical values is provided, that the incremental encoder comprises a device for changing its operating current, that this device is in controlling connection with the temperature-measuring device and/or the comparison device in such a manner that the operating current can be adjusted as a function of the operating temperature and/or the result of the comparison, that the control device comprises a measuring device for the operating current, where that measuring device is in controlling connection with the output stage in such a manner that on the occurrence of an operating temperature lying outside of the range of theoretical values the power supply to the electric motor is disconnected and/or the power of the electric motor is limited.

BRIEF DESCRIPTION OF THE DRAWINGS

In the following, embodiments of the invention are explained in more detail with the aid of the drawings, wherein.

DETAILED DESCRIPTION OF THE INVENTION

Figure 1:
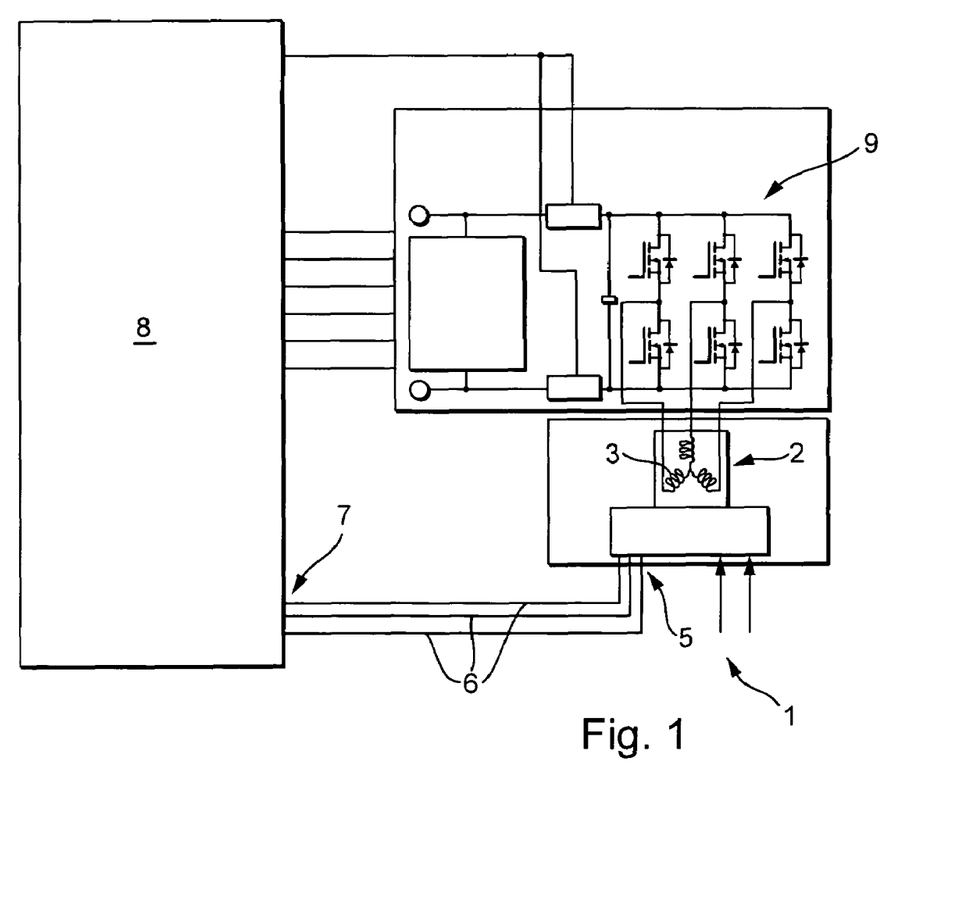
FIG. 1 is a schematic circuit diagram of an actuator which comprises an electric motor, an incremental encoder, and a control device for the electric motor.

As seen in FIG. 1, actuator 1 for a motor vehicle comprises an electric motor 2 which is connected, via a gear mechanism not represented in more detail in the drawing, to an actuating element for a plate clutch. The electric motor 2 comprises a primary part with a motor winding 3 and a permanent-magnet secondary part. At the periphery of the secondary part a row of magnetic segments is disposed, in a manner known per se, which has alternating north and south poles and works together with the winding via an air gap.

An incremental encoder, which comprises several Hall sensors 4 which are disposed so as to be fixed on the primary part, which are spaced from one another in the peripheral direction of the primary part, and which face the secondary part's magnetic segments and detect their magnetic field, is provided on the electric motor 2 to register the position of the secondary part relative to the primary part.

The incremental encoder comprises a position measurement signal output 5 at which a digital position measurement signal can be output as a function of the relative position between the primary part and the secondary part. The position measurement signal can assume a predefined number of different signal states, each of which is assigned to a relative position. In the embodiment examples shown in FIGS. 2 and 3 the circuit patterns of the Hall sensors 4 are chosen so that in the case of a fault-free measurement of position the signal states "000" and "111" do not occur.

For the commutation of the electric motor 2 the position measurement signal output 5 is connected via electrical connecting lines 6 to a position measurement signal input 7 of a control device 8 at a distance from the incremental encoder. This control device 8 is connected via an output stage to the motor winding 3. As can be seen in FIG. 1, the output stage comprises a bridge circuit with semiconductor switches.

The control device 8 comprises a device for checking the plausibility of the position measurement signal. This device is designed in such a manner that on the occurrence of an implausible signal state the power supply to the electric motor 2 is interrupted or at least limited.

The incremental encoder comprises a temperature-monitoring device which is designed to register the operating temperature of the electric motor 2.

Figure 2:
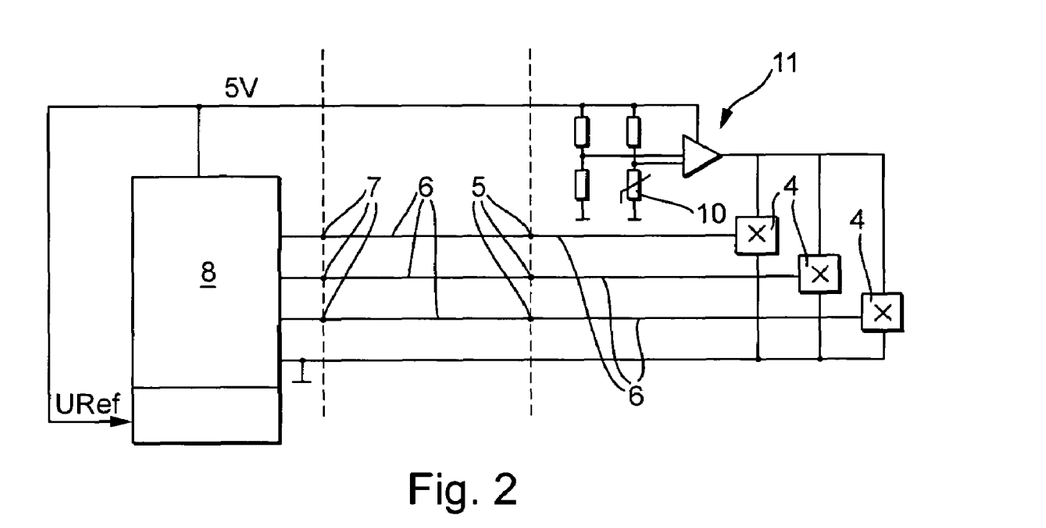
FIG. 2 is a partial circuit diagram of a first embodiment example of the actuator.

In the embodiment example shown in FIG. 2 the temperature-monitoring device comprises a thermally well conductive NTC thermistor 10 connected to the primary part of the electric motor 2. This NTC thermistor 10 is part of the comparison device 11, which compares the operating temperature of the electric motor 2 to a predefined range of theoretical values. An output of the comparison device 11 is connected to power supply connections of the Hall sensors 4. If the operating temperature lies within range of theoretical values, an electrical power supply voltage is present at the Hall sensors 4. If the operating temperature lies outside of the range of theoretical values, the power supply voltage is switched off. At the position measurement signal input 7 the implausible signal state "000" is then present. The control device 8 recognizes this and switches off the electric motor 2. In FIG. 2 it can still be seen that the comparison device 11 is supplied from a power supply device which is integrated into the control device 8. This control device is at a distance from the incremental encoder.

Figure 3:
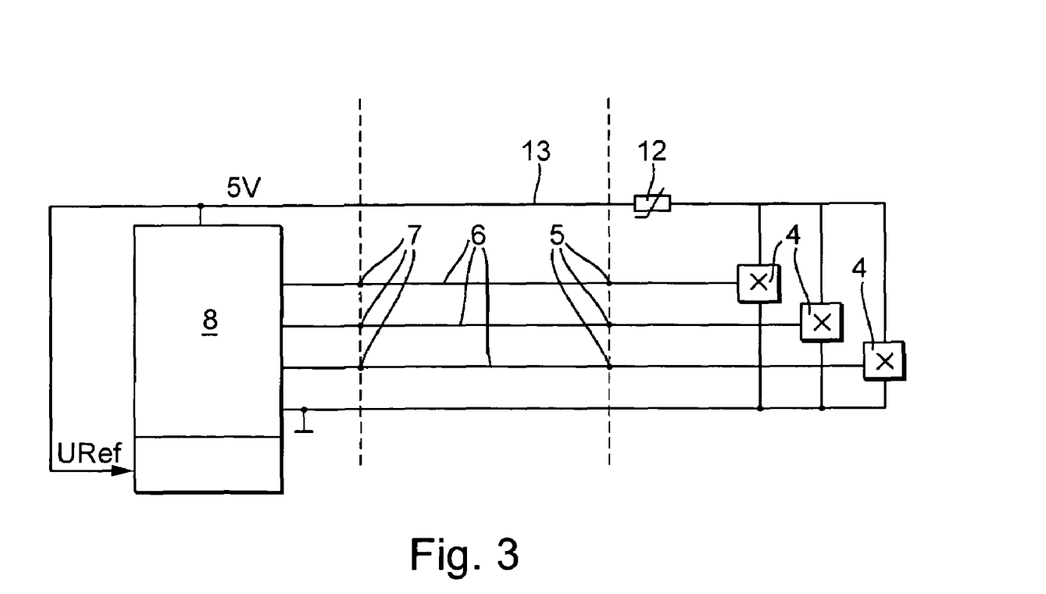
FIG. 3 is a partial circuit diagram of a second embodiment example of the actuator.
Figure 4:
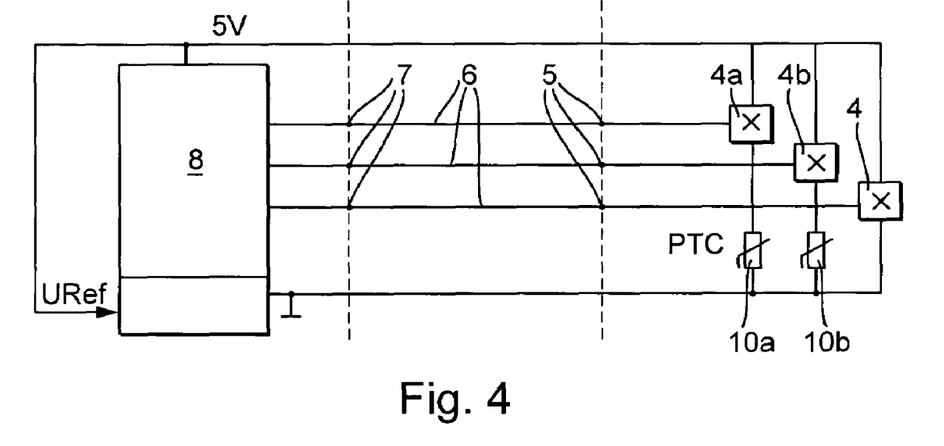
FIG. 4 is a partial circuit diagram of a third embodiment example of the actuator.

In the embodiment example shown in FIG. 3 the temperature-monitoring device comprises a thermally well conductive PTC thermistor 12 which is connected to the primary part of the electric motor 2 and which is connected in a power supply line 13 which connects power supply connections of the Hall sensors 4 to the power supply device. Due to the PTC thermistor 12 connected in series to the Hall sensors 4 the power supply voltage at the Hall sensors 4 decreases with increasing operating temperature of the electric motor 2 until the Hall sensors 4 no longer connect if the operating temperature lies outside of the predefined range of theoretical values. With this, in the embodiment example shown in FIG. 2 the implausible signal state "000" is applied to the position measurement signal input 7. The control device 8 recognizes this and switches off the electric motor 2.

The position measurement signal output 5 comprises several output connections assigned to different positions or bits of the position measurement signal. Along with this, a Hall sensor 4 is provided for each bit. While in the embodiment examples according to each of FIGS. 2 and 3 all the output connections are set to a predefined potential if the operating temperature of the electric motor 2 lies outside of the predefined range of theoretical values, in the embodiment example shown in FIG. 3 the Hall sensors 4 are switched off individually as a function of the operating temperature of the electric motor 2. This is achieved by a first NTC thermistor 10a being connected in the power supply line of a first Hall sensor 4a and a second NTC thermistor 10b, with temperature characteristics different from the temperature characteristics of the first NTC thermistor 10a, being connected in the power supply line of a second Hall sensor 4b. On the occurrence of an operating temperature lying outside of a first range of theoretical values the first Hall sensor 4a is switched off for the transmission of a temperature warning to the control device. The control device detects the signal pattern "xx0" and reduces the power of the electric motor 2, for example, by certain functions of the motor vehicle for which the electric motor would have to be controlled being disabled. For this, the temperature warning can in given cases be relayed to a super-ordinate control. If the first Hall sensor 4a is switched off, the electric motor is commutated with the remaining bits of the positioning signal in a kind of emergency mode.

On the occurrence of an operating temperature lying outside of a second range of theoretical values, a second Hall sensor 4b is switched off in addition to the first Hall sensor 4a. The control device detects the signal pattern "x00" and disconnects the power supply to the electric motor via the output stage.

Figure 5:
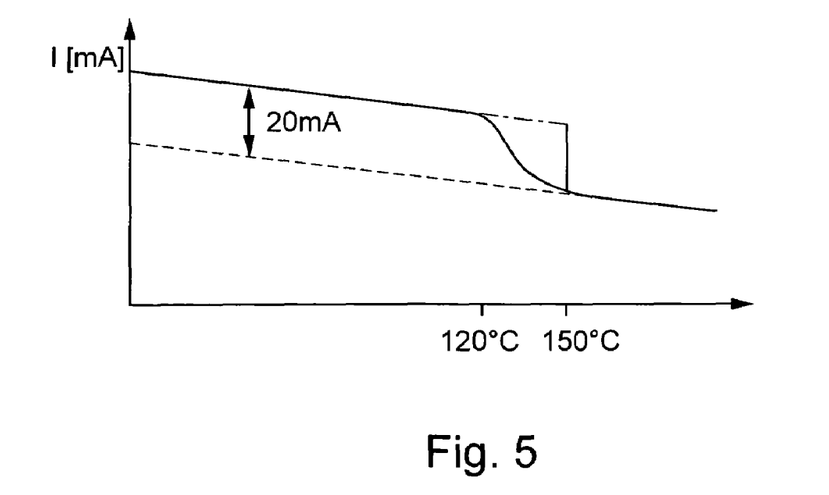
FIG. 5 is a graphic representation of the power consumption of the incremental encoder as a function of the operating temperature of the electric motor, where the operating temperature is plotted on the x-axis and the current is plotted on the y-axis.
Figure 6:
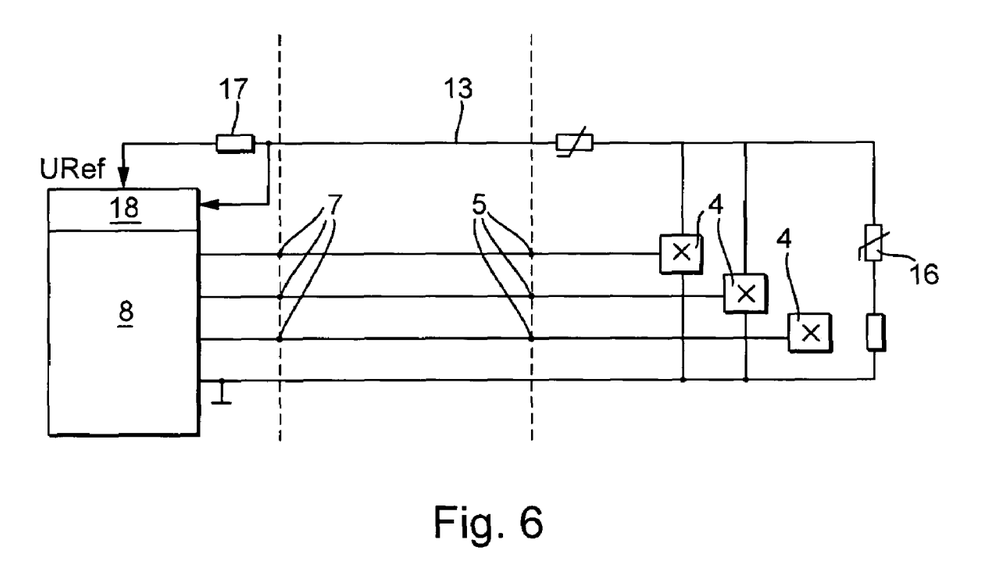
FIG. 6 is a partial circuit diagram of a fourth embodiment example of the actuator.
Figure 7:
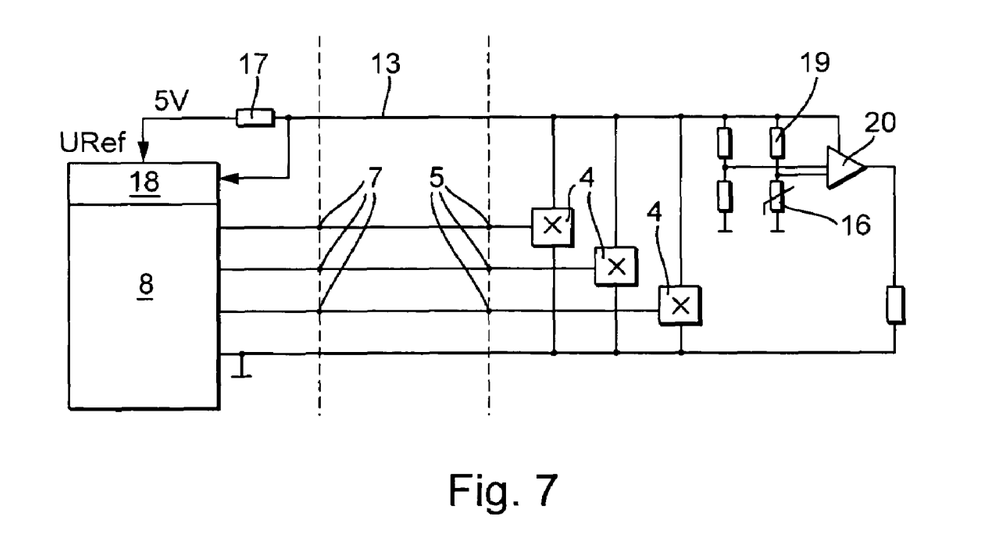
FIG. 7 is a partial circuit diagram of a fifth embodiment example of the actuator.

In the embodiment examples shown in FIGS. 6 and 7 the incremental encoder comprises a thermally conductive temperature sensor connected to the electric motor 2. In the embodiment example according to FIG. 6 the temperature sensor is a thermistor 16 which has a non-linear characteristic curve and is connected in parallel to the power supply connections of the Hall sensors 4. In FIG. 5 it can be seen clearly that, due to the thermistor 16 connected in parallel, the operating current of the incremental encoder varies as a function of the operating temperature of the electric motor 2. With this, at operating temperatures below approximately 120° C. an offset is impressed on the operating current of the Hall sensors 4. In an operating temperature range between approximately 120° C. and 150° C. the offset decreases with increasing temperature to a negligibly small value.

The control device 8 comprises a measuring device with a shunt 17 which is connected in series with the Hall sensors 4. The electrical voltage proportional to the operating current and decreasing at the shunt 17 is digitized by means of an A/D converter 18 and the digital value thus obtained is supplied to a comparison device in order to compare it to a predefined range of theoretical values. The comparison device is in controlling connection with the output stage 9 in such a manner on the occurrence of an operating temperature lying outside of the range of theoretical values the power supply to the electric motor 2 is switched off.

In the embodiment example shown in FIG. 7 the thermistor 16 is connected in series with a resistor element 19 to form a half-bridge at which a constant electrical voltage is present. The half-bridge is connected between the resistor 16 and the resistor element 19 to a first input of an amplifier 20. A second input of the amplifier 20 is at a fixed electrical potential. An output of the amplifier 20 is connected to a load resistor. The power supply connections of the amplifier 20 are connected in parallel to the power supply connections of the Hall sensors 4.

LIST OF REFERENCE NUMBERS

1 Actuator
2 Electric motor
3 Motor winding
4 Hall sensor
4a First Hall sensor
4b Second Hall sensor
5 Position measurement signal output
6 Connecting line
7 Position measurement signal input
8 Control device
9 Output stage
10 NTC thermistor
10a First NTC thermistor
10b Second NTC thermistor
11 Comparison device
12 PTC thermistor
13 Power supply line
16 Resistor
17 Shunt
18 A/D converter
19 Resistor element
20 Amplifier

What we claim is:

1. An actuator (1) for the actuation of a clutch and/or a gear mechanism in a motor vehicle, comprising an electric motor (2) and an incremental encoder therefor, where the incremental encoder comprises a position measurement signal output (5) at which a position measurement signal can be output which has a number of different signal states, each of which is assigned to a relative position between a primary part and a secondary part of the electric motor (2), where, for the commutation of the electric motor (2), the position measurement signal output is connected to a position measurement signal input (7) of a control device (8) for a motor winding (3) of the electric motor (2), where the control device (8) comprises a device for checking plausibility of the position measurement signal and is operatively arranged such that, on the occurrence of an implausible signal state, the power supply to the electric motor (2) is disconnected and/or the power of the electric motor (2) is limited, wherein the incremental encoder comprises a temperature-monitoring device which is formed to register the operating temperature of the electric motor (2) and the incremental encoder is operatively arranged such that, on the occurrence of an operating temperature lying outside of the range of theoretical values, an implausible signal state is applied at the position measurement signal output (5).

2. The actuator (1) recited in claim 1, wherein the position measurement signal output (5) comprises several output connections assigned to different positions or bits of the position measurement signal and the incremental encoder is operatively arranged such that, on the occurrence of an operating temperature lying outside of the range of theoretical values, an output connection is set to a predefined, fixed electrical potential.

3. The actuator (1) recited in claim 1, wherein the incremental encoder comprises Hall sensors (4, 4a, 4b) for the detection of a magnetic field dependent on the relative position between the primary part and the secondary part, that operating voltage connections of the Hall sensors (4, 4a, 4b) are connected to the power supply device, and the temperature-monitoring device is in controlling connection with the power supply device such that, on the occurrence of an operating temperature lying outside of the range of theoretical values, the electrical power supply voltage present at the operating voltage connection of at least one of the Hall sensors (4, 4a, 4b) is reduced or switched off.

4. The actuator (1) recited in claim 2, wherein the incremental encoder comprises Hall sensors (4, 4a, 4b) for the detection of a magnetic field dependent on the relative position between the primary part and the secondary part, that operating voltage connections of the Hall sensors (4, 4a, 4b) are connected to the power supply device, and the temperature-monitoring device is in controlling connection with the power supply device such that, on the occurrence of an operating temperature lying outside of the range of theoretical values, the electrical power supply voltage present at the operating voltage connection of at least one of the Hall sensors (4, 4a, 4b) is reduced or switched off.

5. The actuator (1) recited in claim 3, wherein the temperature-monitoring device is in controlling connection with the power supply device in such a manner that on the occurrence of an operating temperature lying outside of the range of theoretical values the electrical power supply voltages present at the operating voltage connections of all the Hall sensors (4, 4a, 4b) are reduced or switched off.

6. The actuator (1) recited in claim 1, wherein the incremental encoder is operatively arranged such that on the occurrence of an operating temperature lying outside of a first range of theoretical values an implausible first signal state, or a sequence of implausible first signal states, is/are applied at the position measurement signal input (7), and on the occurrence of an operating temperature lying outside of a second range of theoretical values an implausible second signal state, or a sequence of implausible second signal states, is/are applied at the position measurement signal input (7), and the control device (8) is operatively arranged such that, on the occurrence of the first signal state, or the sequence of first signal states, the power of the electric motor (2) is limited and on the occurrence of the second signal state, or the sequence of second signal states, the power supply to the electric motor (2) is disconnected.

7. The actuator (1) recited in claim 1, wherein the position measurement signal output (5) comprises several output connections assigned to different positions or bits of the position measurement signal and that on the occurrence of the operating temperature lying outside of the first range of theoretical values a first output connection is set to a predefined, fixed electrical potential and on the occurrence of the operating temperature lying outside of the second range of theoretical values a second output connection is set to a predefined, fixed electrical potential.

8. A method for operating an actuator (1) in a motor vehicle, said actuator comprising an electric motor (2), said method comprising the steps of:

registering a position measurement signal for the electric motor (2);

commutating the electric motor (2) as a function of the position measurement signal, wherein the position measurement signal has a number of different signal states, each of which is assigned to a relative position between a primary part and a secondary part of the electric motor (2), where the plausibility of the position measurement signal is checked and, on the occurrence of an implausible signal state, disconnecting the power supply to the electric motor (2) and/or limiting the power of the electric motor (2), wherein the operating temperature of the electric motor (2) is registered and compared to a predefined range of theoretical values and that, on the occurrence of an operating temperature lying outside of the range of theoretical values, an implausible signal state of the position measurement signal is produced.

9. An actuator (1) operatively arranged for actuation of a clutch and/or a gear mechanism in a motor vehicle, said actuator comprising an electric motor (2) comprising a motor winding (3) and an incremental encoder therefor, where the incremental encoder comprises a position measurement signal output (5) which, for commutation of the electric motor (2), is connected to a position measurement signal input (7) of a control device (8) for the electric motor (2), where the control device (8) comprises a power supply device for the incremental encoder and is connected via an output stage (9) to the motor winding (3), wherein the incremental encoder comprises a temperature-measuring device for registering the operating temperature of the electric motor (2), and further comprising a comparison device for comparing the registered operating temperature to a predefined range of theoretical values, wherein the incremental encoder comprises a device for changing its operating current, said device in controlling connection with the temperature-measuring device and/or comparison device in such a manner that the operating current can be adjusted as a function of the operating temperature and/or the result of the comparison, the control device comprising a measuring device for the operating current, where that measuring device is in controlling connection with the output stage in such a manner that, on the occurrence of an operating temperature lying outside of the range of theoretical values, the power supply to the electric motor (2) is disconnected and/or the power of the electric motor (2) is limited.

* * * * *

UNITED STATES PATENT AND TRADEMARK OFFICE
CERTIFICATE OF CORRECTION

PATENT NO.         : 7,486,490 B2
APPLICATION NO.    : 11/637974
DATED              : February 3, 2009
INVENTOR(S)        : Thomas Pfund et al.

It is certified that error appears in the above-identified patent and that said Letters Patent is hereby corrected as shown below:

On the cover page of the Patent item (75),

The address of inventor, Wai-Wai Buchet, should read:
Strasbourg (FR)

The address of inventor, Sven-Jostein Kro, should read:
Ottersweier (DE)

Signed and Sealed this

Ninth Day of June, 2009

JOHN DOLL
*Acting Director of the United States Patent and Trademark Office*